M. L. KEEN & H. BURGESS,
Assignors to AMERICAN WOOD PAPER CO.
PROCESS AND APPARATUS FOR EVAPORATING AND CALCINING ALKALINE SOLUTIONS.
No. 7,485. Reissued Jan. 30, 1877.
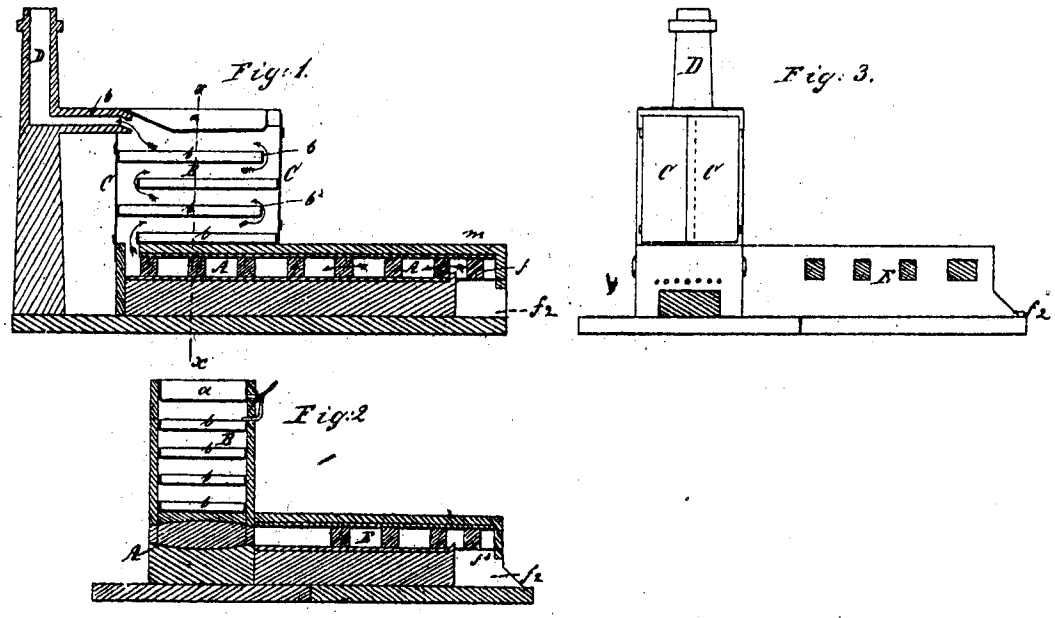
Witnesses:
Samuel Sea.
Phenlonsch
Inventors.
Morris L. Keen
Hugh Burgess

7,485. PROCESSES AND APPARATUS FOR EVAPORATING AND CALCINING ALKALINE SOLUTIONS. M. L. Keen, Stroudsburg, and Hugh Burgess, Royer's Ford, Pa., assignors to American Wood Paper Company. Patent No. 46,244, dated Feb. 7, 1865. [Filed Jan. 17, 1877.]

*To all whom it may concern:*

Be it known that we, MORRIS L. KEEN, of Stroudsburg, in Monroe county, and State of Pennsylvania, formerly of Royer's Ford, in Montgomery county, and State of Pennsylvania, and HUGH BURGESS, of said Royer's Ford, have invented certain new and useful improvements in recovering alkali for use in pulping wood, and similar vegetable substances, from the alkaline solutions with which such substances have been treated, and in apparatus for evaporating and calcining such alkaline solutions, and the following is a description of the process and the construction and operation of the apparatus for performing the same, which we have invented, reference being had to the accompanying drawing, making part of this specification, in which—

Figure 1 represents a longitudinal and vertical section, taken through the body of the main furnace. Fig. 2 represents a vertical transverse section through the line *x x* of Fig. 1, and showing also in section the calcining-furnace connected thereto. Fig. 3 represents a front elevation of the evaporating-furnace, and a side view of the calcining-furnace.

Similar letters of reference, where they occur in the separate figures, denote like parts in all the drawings.

In the process of pulping or disintegrating wood, straw, and other similar fiber-yielding substances by the use of alkaline solutions—which, as is well known, are prepared by dissolving soda-ash of commerce or commercial caustic soda or alkali in water with lime, then settling the same and drawing off the clear alkaline solution with which the wood is treated—it is desirable to recover the alkali in such solution on account of the cost of the alkali in relation to the price of the paper into which the wood-pulp is made, and the cost of manufacturing it, and in order to effect a saving in the manufacture of paper from wood and similar fiber-yielding substances. This recovering of the alkali is effected by us by evaporating the liquors in which the vegetable matters have been treated, to a state of dryness, and completing the restoration of the dry mass to ash similar to the original whence the fresh alkaline solution was obtained for the pulping process, by burning and calcining the same.

For this purpose we make use of a furnace constructed and operated in such manner that the liquid to be evaporated on the sole or hearth of the furnace is directly exposed to the flame and hot gases from the fire, which are urged by a blast or strong draft. And when the solution is evaporated to dryness the mass on the sole or hearth of the furnace is further exposed directly to the flame and hot gases from the fire in continuation of the process of recovering the alkali, thereby consuming the vegetable matters contained in the mass and completing the restoration of the alkali; and we also use, in combination with the main evaporating-furnace, one or two calcining or finishing furnaces, as an appendage to the evaporating-furnace, or separately from it, but forming a continuation of the process of recovering the alkali; and we, moreover, utilize the remainder of the heat of the flame and hot gases from the fire unabsorbed after their passage over the surface of the liquid to be evaporated on the sole or hearth of the furnace, by passing it, before its final escape to the chimney or stack, over and under a series of pans, or their equivalent, through which flows the alkaline solution in its transit from the reservoir to the hearth.

To enable others skilled in the art to make and use our invention, we will proceed to describe the same with reference to the drawing.

A represents the main evaporating-hearth, and B the pan-chamber closed at each end by iron doors C. *a* represents a reservoir, in which the liquor to be evaporated is collected after the pulping process is performed, and this reservoir *a* may be placed, as shown, over the pan-chamber, or in other convenient position. The solution to be evaporated is supplied from this reservoir by a cock or other controlable means to the pans *b* in quantity proportionate to the evaporation to be effected. The alkaline solution flows from one pan to the next below it by means of the overflows $b^2$ until it reaches the hearth A, where it is exposed to the action of the flame and gases from the fire, which is at *f*. The fire is urged by a blast or strong draft, which enters the ash-pit at $f^2$. The course of the hot air and gases is indicated by the arrows, which show their passage over the surface of the solution on the hearth and under and over the pans, when it is passed out by the flue *h* to the chimney or stack D. The alkaline solution, after passing through the pans, reaches the hearth more or less inspissated. The evaporation is partially or wholly completed on the hearth when the alkaline mass is ready for calcination. The calcination is performed similarly to the evaporation, by exposing the alkaline mass directly to the action of the flame and hot gases from the fire urged by a regulated blast or draft, and at a lower temperature than that employed for evaporation, to prevent loss of the alkali by sublimation, and the calcination is aided by the combustion of the vegetable matter contained in the alkaline mass.

This calcination may be effected in another furnace, in which a lower degree of heat is maintained to prevent loss of the alkali by sublimation. In such case the calcining-furnace may be separate from the main evaporator, or, as we prefer, attached to it, as shown in Figs. 2 and 3, at E, and connected with it at or near the bridge wall M. The calcining-furnace E, or, as we prefer, two furnaces, E E, are constructed in every way similar to the hearth of the main evaporator A, and are provided with fires at their ends $f^3$, which are urged by a regulated blast or draft. At the proper stage of inspissation of the solution on the hearth of the main evaporator the said solution is allowed to flow, or may be moved, into the calcining furnace or furnaces E E, and there evaporated to dryness and calcined. The products of combustion of the vegetable matter in the alkaline mass passing over the hearth of the main evaporator are thus utilized. When two furnaces, E E, are constructed they are used alternately, thus obviating the necessity of lowering the temperature of the main evaporator, which is worked continuously.

It is obvious that the number, form, and mode of setting the pans may be altered to suit the circumstances of the case; or, if it is deemed desirable, in the place of a series of pans the following may be adopted: A tower constructed of stone, brick, or iron may be filled with pieces of stone, brick, or other suitable material, down and over which the alkaline solution is made to flow by any suitable arrangement on top of the tower, while the waste or excess of heat from the hearth of the furnace enters the tower at or near its base, and in its ascent is absorbed by the descending alkaline solution, which flows onto the hearth from the receiving-tank.

Having thus described our invention, what we claim as new, and desire to secure by Letters Patent, is—

1. The improved process of recovering the alkali from alkaline solutions used in pulping wood, by first evaporating such solution to dryness, and then consuming the vegetable matter and calcining the alkaline mass by exposing the solution and dry mass directly to the action of the flame and hot gases from the fire, substantially as described.

2. The improved process of evaporating and calcining alkaline solutions used in pulping wood by exposing the solution until evaporated to dryness, and the dry mass until calcined to the direct action of the flame and hot gases from the fire, urged by a blast, whereby the vegetable matter is consumed, and the alkali recovered from the solution, substantially as described.

3. The improved process of calcining alkaline solutions, used in pulping wood, and evaporated to dryness, by exposing the mass to the direct action of the flame and hot gases from the fire, urged by a regulated blast, whereby the vegetable matter is consumed and the alkali recovered, substantially as described.

4. In combination with the main evaporating-hearth of a furnace, the finishing or calcining furnace or furnaces, substantially as described.

5. An improved furnace for recovering the alkali from alkaline solutions used in pulping wood, constructed with a sole or hearth where the solution is evaporated nearly or quite to dryness, in combination with a pan or pans, or the equivalent thereof, where the heat from the fire unabsorbed in its passage over the hearth is utilized for evaporating the solution contained in said pan or pans, substantially as described.

MORRIS L. KEEN.
HUGH BURGESS.

Witnesses:
SAMUEL LEA,
THEODORE NYE.

30.7.77.